Dec. 9, 1958 A. C. LUTHER, JR 2,863,943

FEEDBACK CLAMPING CIRCUIT ARRANGEMENTS

Filed Nov. 30, 1954 2 Sheets-Sheet 1

INVENTOR.
ARCH C. LUTHER
BY
ATTORNEY

Dec. 9, 1958 A. C. LUTHER, JR 2,863,943

FEEDBACK CLAMPING CIRCUIT ARRANGEMENTS

Filed Nov. 30, 1954 2 Sheets-Sheet 2

INVENTOR.
ARCH C. LUTHER
BY
ATTORNEY

United States Patent Office 2,863,943

Patented Dec. 9, 1958

2,863,943

FEEDBACK CLAMPING CIRCUIT ARRANGEMENTS

Arch Clinton Luther, Jr., Merchantville, N. J., assignor to Radio Corporation of America, a corporation of Delaware Application November 30, 1954, Serial No. 472,021

12 Claims. (Cl. 178—7.3)

The invention relates to circuit arrangements for translating electric wave energy and it particularly pertains to auxiliary circuitry for restoring low frequency and direct current components of the electric wave where the latter have been lost in non-conductive input coupling circuits of the electric wave translating device.

One very important application of the subject circuitry involves apparatus suitable for processing a television signal, which as those skilled in the art will recognize, may require restoration of a direct current component for accurate representation of the picture information. In present television practice, the image of a scene to be televised is projected onto a suitable pickup device which develops electric wave signals representative of light values of elemental areas of the picture image. These signals are transmitted to a signal-processing device which may include non-conductive coupling means for translating the signal to the image reproducing device. Since the light values are relative to a given background brightness level represented by the direct current (D.-C.) component of the signal, it is necessary that the composite signal be referred to that reference level, at certain points in the overall transmission system. Where such points are preceded by a capacitive coupling device, for example, a capacitor or an equivalent device, the D.-C. component must be effectively restored. Perhaps the most common example of D.-C. restoration is that which is ordinarily provided at the input electrode of television receiver image-reproducing device, or kinescope.

In accordance with existing television broadcasting standards, the scanning in the receiving apparatus is synchronized with that of the transmitting apparatus by the transmission of line and field-rate synchronizing pulses which are superimposed on blanking pedestals during recurring retrace intervals. The blanking pedestals are ordinarily established at some arbitrary, predetermined picture signal level, usually that corresponding to black, which in turn, usually is made to correspond to cut-off of the image reproducing device, or kinescope.

In view of the necessity for restoring the D.-C. component and for setting the conduction level of image-reproducing devices and other electric wave translating circuit arrangements, especially those in television transmitters and receivers, many proposals have been made for accomplishing the desired results. Among the various arrangements known to the art of television broadcasting, there is the keyed clamping circuit, an example of which is disclosed in U. S. Patent No. 2,299,945, issued October 27, 1942, to K. R. Wendt. The arrangement disclosed in the above mentioned patent to Wendt and other arrangements of the known art afford excellent means for securing the desired results and the circuit arrangements according to the invention also afford means for eliminating the drift problems which arise in the more conventional circuits and for reducing the steady-state errors which are common in the simple diode D.-C. restorer circuits.

It is an object of the invention to provide keyed clamping and D.-C. restoring circuit arrangements of improved characteristics, particularly with respect to the operating voltage drift- and steady-state characteristics.

Another object of the invention is to provide keyed clamping and D.-C. restoring circuit arrangements of improved stability due to self-regulating circuitry.

A still further object of the invention is to provide a keyed clamping circuit arrangement which does not amplify the electric wave to be translated and in which the clamping is dependent solely on the characteristics of the clamping circuit.

Still another object of the invention is to provide a keyed clamping circuit arrangement which is not dependent on the shape of the gate or keying pulse.

The objects of the invention are attained in a circuit arrangement involving a device for translating the electric wave signals, having an input circuit, an output circuit and a capacitive coupling device in the input circuit to provide coupling to the preceding circuit. A coupling element connected to the output of the translating device and to a synchronous electronic switching device are arranged to connect the coupling element to the input circuit of the translating device to provide complete output-to-input feedback on the electric wave translating device when the electronic switch is closed during the clamping periods or interval. The electronic switching device is arranged to be closed in response to applied gating pulse energy which may be derived from a separate auxiliary source, such as for example the blanking pulse generating circuit of a television broadcast transmitter, the synchronizing pulse separating circuit of a television receiver and the like. When the electronic switching device is closed, a low impedance is presented across the electric translating device whereby the capacitive coupling device will be charged to a value depending upon the instantaneous level of the output voltage of the electric wave translating device.

The simplest possible coupling element according to the invention is a direct potential supply device, for example in the form of a battery, having the positive pole connected to the output of the electric wave translating device and the negative pole connected to the synchronous switching circuit. Circuit equilibrium occurs when the sum of the output potential of the electric wave translating device at the onset of the clamping interval plus the numerical value of the potential at the input circuit of the electric wave translating device at the time, which establishes the potential at the output circuit, is equal to the battery potential. If the output potential of the electric wave translating device is much greater than the input voltage, the characteristics of the electric wave translating device will have little effect on the circuit equilibrium.

The obvious disadvantages of the floating battery coupling element may be avoided by a coupling element comprising one resistor connected between the output circuit of the electric wave translating device and the electronic switching device and another resistor connected between the terminal of the electronic switching device to which the one resistor is connected and the negative pole of the series battery, the positive pole of which is at fixed reference potential or ground. Negative series battery or source of potential is required with this coupling element and the resistors will reduce the feedback loop gain even when they are of value sufficiently high as not to load the output circuit of the electric wave translating device.

The positive potential supply normally associated with electronic conventional amplifying devices, may be used for energizing all circuits by using a pulse amplitude modulating circuit arrangement according to the invention. The modulating circuit generates a pulse of amplitude depending on the difference between the voltage at the output circuit of the electric wave translating device and a steady reference potential which is introduced as the peak level of a gating pulse applied to the pulse amplitude modulator. The output of the modulator is applied by way of the electronic switch to charge the capacitive coupling element to the peak value of the pulse delivered by the modulator. This circuit arrangement has the advantage that clamping depends only on the characteristics of the modulator, which is not required to amplify the electric wave. The modulator also serves to provide a voltage gain in the control loop, rendering the feedback more effective. The characteristics of the electronic switching device are relatively unimportant as are the characteristics of the electric wave translating device itself since both are completely within the feedback loop. With this arrangement, if the video wave level is high compared to the drift error of the modulating circuit, the clamping drift errors may be held extremely low.

In order that the practical aspects of the invention may be more fully appreciated, several express embodiments, given by way of examples only, are described below with reference to the accompanying drawing in which.

Figures 1, 2, 3:
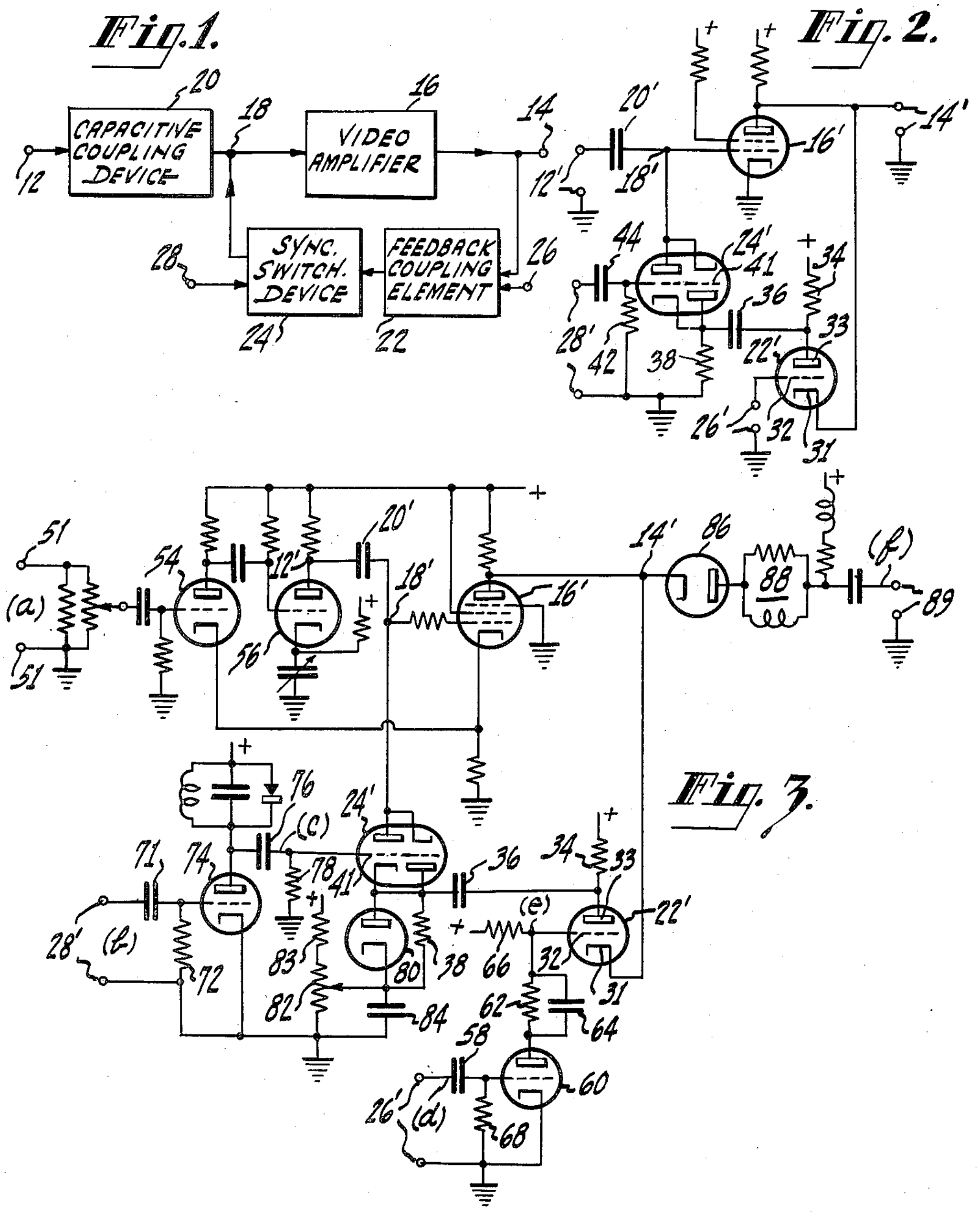
Fig. 1 is a functional diagram of the feedback clamping circuit arrangement according to the invention.
Fig. 2 is a schematic diagram of one practical embodiment of the circuit arrangement outlined in Fig. 1.
Fig. 3 is a schematic diagram of portions of a television camera control amplifier incorporating a feedback clamping circuit according to the invention.

Referring to Fig. 1 there is shown a functional diagram of a circuit arrangement for translating electric wave energy between electric energy terminals 12 and output terminals 14 comprising an electric wave energy translating device 16 having an output circuit coupled to the output terminals 14 and an input circuit coupled at input circuit terminals 18 by means of a capacitive coupling device 20 to the preceding circuit at the electric energy terminals 12. To overcome the loss of the D.-C. component incurred by the presence of the capacitive coupling device 20, a potential having a value depending upon the instantaneous potential value at the output circuit of the wave energy translating device 16 is transferred by means of a feedback coupling element 22 and a synchronized electronic switching device 24 to the input circuit terminals 18 of the video amplifying device 16. A reference voltage of predetermined value is applied to the feedback coupling element 22 at the reference potential input terminals 26. The synchronized switching device 24 in the usual case is synchronized with circuit operation. Synchronization can be achieved by applying synchronizing pulses to the synchronizing switching device 24 at the synchronizing input terminals 28. As heretofore indicated the simpliest possible coupling element 22 would be a direct potential supplying device having the positive pole connected to the output terminals 14 and the negative pole connected to the input of the synchronized switching device 24. In this arrangement, the potential of the supplying device is the reference potential, whereby no potential need be applied at the terminals 26. Equilibrium is obtained when the potential across the terminals 18 is equal to the difference between the reference potential and the instantaneous potential across the terminals 14 during the clamping interval. The capacitive coupling device is then charged to the value of the reference potential through the low impedance path of the preceding circuit connected to the input terminals 12. While this circuit arrangement may be used for laboratory and other experimental arrangements with excellent results, the floating potential supply obviously is not practical for several important reasons, including cost and inconvenience. A terminal of the direct potential supplying device used for the feedback coupling element 22 may be connected to a point of fixed reference potential or ground by using a resistive network comprising a resistor connected between an ungrounded output terminal 14 and an ungrounded input terminal of the synchronized switching device 24. Another resistor is connected between the ungrounded terminal of the synchronized switching device 24 and the negative pole of the D.-C. potential supply. This arrangement is theoretically perfectly satisfactory but suffers from the practical disadvantages that the resistors must be of high value in order not to unduly load the output circuit of the amplifying device 16 and not to reduce the feedback loop gain. In addition the positive terminal of the potential supply is maintained at reference potential, or ground, and this means that an additional potential supplying device must be provided since in the conventional circuitry the negative pole of the power supply device is maintained at the fixed reference potential, or ground.

Preferably therefore according to the invention the feedback coupling element 22 is constituted by a pulse amplitude modulating circuit examples of which are shown in the embodiments to be described hereinafter.

A simple and effective example of a feedback clamping circuit according to the invention is shown schematically in Fig. 2. Electric wave energy in the form of a composite video signal is applied across the input terminals 12' which are coupled by leads including a capacitor 20' to the input circuit of a video frequency amplifying controlled electron flow path device shown here as an electron discharge device 16' at the control electrode or grid terminals 18' and the common circuit electrode or cathode which is maintained at a point of fixed reference potential or ground. The amplified composite video wave is obtained between the output electrode or anode of the discharge device 16' and the cathode which are connected to the output terminals 14' respectively. In this arrangement the feedback coupling element is constituted by another controlled electron flow path device also shown here as an electron discharge device 22' having a common circuit electrode or cathode 31 coupled to the output electrode or anode of the video amplifying discharge device 16', a control electrode or grid 32 and an output electrode or anode 33. A train of positive going pulses of amplitude corresponding to a predetermined reference potential is applied at the terminals 26' between the control or grid electrode 32 and a point of fixed reference potential, or ground. Between clamping intervals the energizing potentials applied to the discharge device 22' are such as to maintain the tube in a blocked condition but during the blanking interval a negative going pulse is developed across a load resistor 34, which pulse is of amplitude equal to the instantaneous potential between the anode and cathode of the electron discharge device 16' less the potential across the grid and cathode. That is the effective potential between the grid 32 and the cathode 31 of the feedback coupling device 22' is equal to the difference between the amplitude of the reference potential applied at the reference potential terminals 26' and the potential between the anode and cathode of the amplifying device 16'. This negative going pulse is applied by way of a capacitor 36 across a resistor 38, the junction between the capacitor 36 and the resistor 38 being connected to the grid of the video signal amplifying device 16' at the terminal 18' by means of a bi-lateral controlled electron flow path device 24'. This device is shown here as an electron discharge device having a control electrode 41 to which synchronizing pulses appearing at the synchronizing pulses input terminals 28' are applied across a resistor 42 by way of an input coupling capacitor 44. The reference potential applied at the terminals 26' is actually increased a bit over the theoretical value required to compensate for the resistance components of the controlled electron flow path or electron discharge devices 22' and 24' so that the potential across the capacitor 20' at the end of the clamping interval is more exactly equal to the instantaneous potential between the anode and the cathode of the amplifying device 16' at the beginning of the clamping interval. This charging of the capacitor 20' is accomplished without upsetting the impedance of the output circuit of the amplifying device 16' as seen from the output terminals 14' at any time in the operating cycle. The charge on the capacitor 20' is equal to the peak value of the pulse developed across the load resistor 34. The use of an amplifying device 22' also serves to provide voltage gain in the control loop which renders the feedback more effective. The characteristics of the switching device 24' are relatively unimportant, as are the characteristics of the amplifying device 16', since they are all within the feedback loop.

While the circuit arrangements described above and those below are excellent for the use with single stage high gain amplifiers, they may also be used with multistage amplifiers with equal success. The only requirement is that the proper phase relationship, more evident as polarity, between the various points in the translating device and the clamping circuitry.

If the gating pulse applied to the reference potential terminals 26' are composite blanking pulses, the feedback coupling device 22' will serve the additional function of adding blanking pulses to the signal for subsequent application to a clipping circuit connected to the output terminals 14'. Such a circuit, in essentially complete form for camera control blanking and clipping is shown in Fig. 3. In this arrangement video frequency signals obtained from television-studio camera equipment are applied to the input terminals 51 and amplified by cascade connected controlled electron flow path or discharge devices 54, 56 and 16'. Standard blanking pulse signals appearing at the reference voltage input terminals 26' are applied by way of a coupling capacitor 58 and input resistor 59 to a clipping circuit comprising a controlled electron flow path device in the form of an electron discharge device 60. This device 60 is used to set the amplitude of the blanking signal pulses to the proper peak level for correct operation of the pulse amplitude modulating stage comprising the coupling element device 22'. The negative going pulse developed across the load resistor 34, which now is equal to the blanking signal pulse, is applied by way of the coupling capacitor 36 to the bilateral controlled electron flow path device 24'. Clamp keying or driving pulses are applied to the synchronizing pulse input terminals 28' for application by way of a coupling capacitor 71 and an input resistor 72 to the control or input element of a driving pulse shaping controlled electron flow path device 74. The driving pulse is arranged to be slightly delayed with respect to and narrower than the blanking pulse, since the blanking pulse is usually wider than the desired clamping interval. By means of a coupling capacitor 76 and an input resistor 78, the shaped driving pulse is applied to the control electrode of the bilateral synchronous switching device 24'. A diode element 80 shunted across the resistor 68 and having the cathode electrode connected to the arm of a potentiometer 82 is arranged to help set the level of the feedback pulse to the synchronous switching device 24'. This additional adjustment of signal level is necessary to correct for slight variations in the incoming camera video signal. Thus the feedback pulse is applied to the amplifying input terminal 18' during the blanking interval so that blanking is inserted in the video signal ahead of the clipping circuit comprising the linear clipping diode 86, the cathode electrode of which is connected to the output terminal 14' and the anode of which is coupled by means of a non-linear impedance network 88 to output terminals 89 for application to the final composite video frequency amplifying circuitry.

It should be noted that in the circuit arrangement of Fig. 3, the clamping feedback so greatly improves the speed of response and effectiveness of the clamping circuit that it is possible to clamp within the video frequency feedback loop. Video frequency feedback inherently tends to resist the action of the clamping circuit, hence a very good clamping circuit is required if the overall performance of the amplifier is to be satisfactory. The video feedback is used to stabilize the gain and linearity characteristics of the amplifying devices 54, 56 as well as improving the frequency response. The circuit arrangement shown in this figure is capable of maintaining gain and pedestal settings within ±1% for a ±10% change in heater or anode potential. Shifts of less than ±5% are encountered when it is necessary to change any electron discharge tube in such a circuit. These figures represent results of an order of magnitude better than those obtained with any known circuit arrangements.

Figures 4, 6:
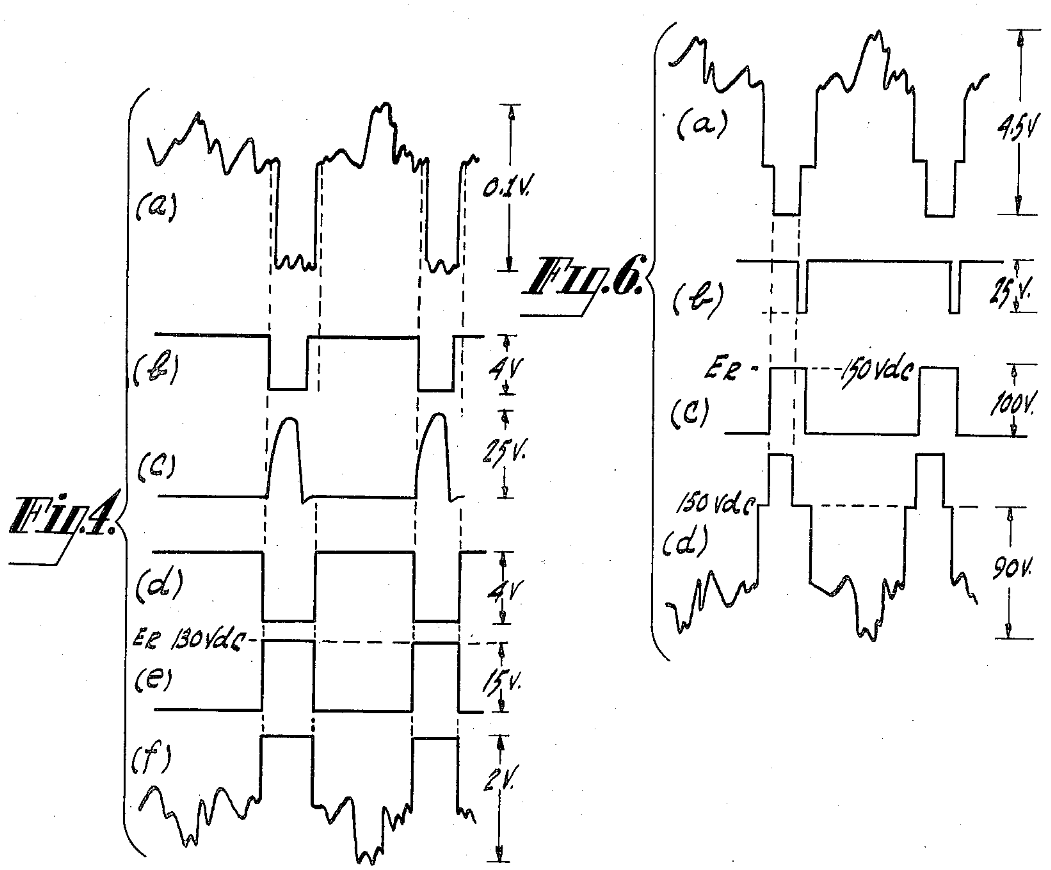
Fig. 4 is a graphical representation of waveforms appearing in the circuit arrangement illustrated in Fig. 3.
Fig. 6 is a graphical representation of waveforms appearing during the operation of the circuit arrangement illustrated in Fig. 5.

Graphical representation of waveforms obtained with the circuit arrangement of Fig. 3 are shown in Fig. 4. The waveforms shown are obtained at the points indicated by the corresponding letters on the schematic of Fig. 3. These waveforms are shown in accurate relative time relationship but are disproportionate in amplitude in order to more clearly show the wave shape, however, examples of the representative amplitudes are given with each curve.

Figure 5:
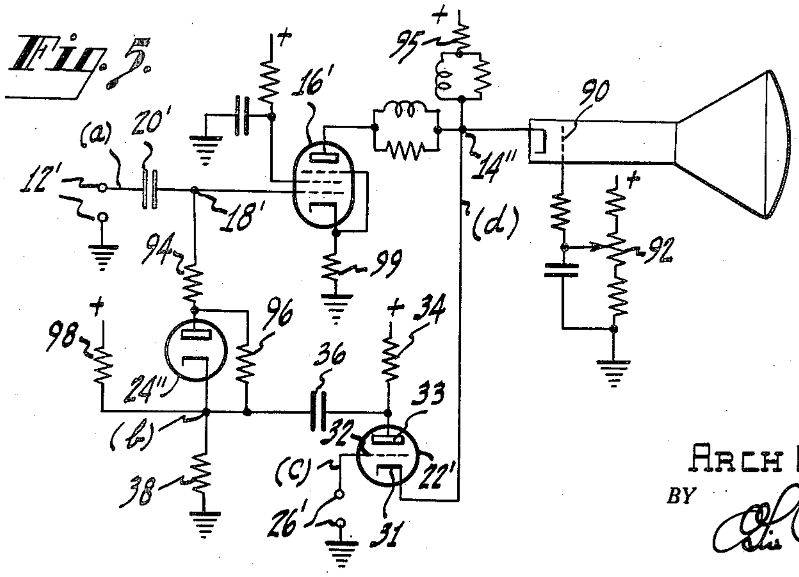
Fig. 5 is a schematic diagram of a television-studio monitor kinescope amplifier stage having a D.-C. restorer circuit arrangement according to the invention.

The use of the feedback clamping principle according to the invention is also applicable to D.-C. restorer circuits of the type used in television receiving circuit arrangements. One such arrangement is shown in Fig. 5 wherein the output terminals 14' is connected to the input circuit of a kinescope 90 at the cathode electrode in this example. The input circuit of the kinescope 90 is completed by the connection, of the grid electrode, to a conventional brightness control potentiometer 92 to the point of fixed reference potential, shown here as ground. The feedback pulse obtained across the load resistor 34 in the same manner as described in connection with the above mentioned embodiments is applied through the coupling capacitor 36 to the cathode of a diode switching device 24'' having an anode electrode connected by means of a series resistor 94 to the input terminal 18'. By means of a resistor 96, shunted across the diode switching device 24'', and a resistor 98 the diode device 24'' is biased positively to conduct only on positive feedback pulses above a predetermined amplitude. In this manner the synchronous switching device 24'' is switched by the feedback pulse, the timing of which is determined by the reference pulse, and no external keying or driving pulse signal is required. The reference pulse wave required for application to the reference pulse input terminal 26' is obtained from the usual synchronizing pulse separating circuit (not shown). Preferably the reference pulses are widened by changing the characteristics of the output circuit of the synchronizing pulse separator to allow the trailing edge to slope off more gradually and then arranging the circuit to clip the pulses to form wider pulses of lower amplitude as required. Such is well within the skill of the artisan and no further details are given here. This circuit arrangement shown is arranged to reduce the steady state errors caused in most diode D.-C. restorer circuits due to inherent limitations of commercially available diode elements. In this arrangement the diode device 24″ serves to rectify the peak value of the error pulse. With this circuit arrangement improved accuracy of D.-C. setting and the ablility to adjust the level effectively at the grid of the output stage so that the characteristics of the amplifying device 16′ are most effectively utilized for high output and drift is compensated for at the anode of the amplifying device 16′. Because of this the circuit is readily arranged for setting on the back porch of the composite video signal without requiring a carefully shaped gating pulse.

Waveforms obtained with the circuit arrangement of Fig. 5 are shown in Fig. 6 with the corresponding letters referring to the letters in the diagram. The time relationship between the waveforms is clearly shown but the wave shapes are exagerated to more effectively show the wave shape and the relative amplitudes are indicated in figures for each curve.

The component values given below were used in a camera control amplifier incorporating feedback clamping according to the invention as shown in Fig. 3 have been successfully operated and the component part values, are given as illustrative examples as an aid to the practice of the invention.

| Ref. No. | Component | Type or Value |
|---|---|---|
| 16′ | Amplifying tube | 6U8. |
| 20′ | Coupling capacitor | 0.001 mf. |
| 22′ | Coupling tube | ½ 12AT7. |
| 24′ | Switching tube | 12AT7. |
| 34 | Load resistor | 10 kilohms. |
| 36 | Coupling capacitor | 0.47 mf. |
| 38 | Resistor | 220 kilohms. |
| 54 | Voltage amplifier | ½ 6BQ7A. |
| 56 | do | ½ 6U8. |
| 60 | Clipping tube | ½ 12AT7. |
| 62 | Anode resistor | 10 kilohms. |
| 64 | Shunt capacitor | 20 mf. |
| 66 | Input resistor | 3300 ohms. |
| 68 | do | 1 megohm. |
| 71 | Coupling capacitor | 0.01 mf. |
| 72 | Input resistor | 1 megohm. |
| 74 | Shaping tube | ½ 6BQ7A. |
| 76 | Coupling capacitor | 470 mmf. |
| 78 | Input resistor | 2.7 megohms. |
| 80 | Leveling diode | ½ 6AL5. |
| 82 | Pedestal adjustment | 50 kilohms. |
| 83 | Series resistor | 220 kilohms. |
| 84 | Bypass capacitor | 0.1 mf. |
| 86 | Clipping diode | ½ 6AL5. |

A television monitor circuit arrangement incorporating the circuit shown in Fig. 5 was constructed and successfully operated with the values of components given below.

| Ref. No. | Component | Type or Value |
|---|---|---|
| 16′ | Video amplifier | 6CL6. |
| 20′ | Coupling capacitor | 0. 01 mf. |
| 22′ | Coupling tube | 6BQ7A. |
| 24′ | Switching tube | ½ 6BQ7A. |
| 34 | Load resistor | 10 kilohms. |
| 36 | Coupling capacitor | 0.22 mf. |
| 38 | Resistor | 220 kilohms. |
| 90 | Kinescope | 17BP-4B. |
| 92 | Brightness control | 250 kilohms. |
| 94 | Grid resistor | 10 kilohms. |
| 95 | Anode resistor | 3 kilohms. |
| 96 | Shunt resistor | 8.2 megohms. |
| 98 | Bias resistor | 2.7 megohms. |
| 99 | Cathode resistor | 10 ohms. |

In each case a power supply delivering 280 volts was used at the terminals marked with the double plus sign (++) and 130 volts at the terminals marked with the plus sign (+).

Obviously other values and potentials will be suggested by those skilled in the art for other applications of the invention.

The invention claimed is:

1. A feedback clamping circuit arrangement for an electric wave signal translating device having an input circuit, an output circuit, and a capacitive coupling device connected to said input circuit, including a feedback coupling element connected to said output circuit, means to apply reference potential to said feedback coupling element, an electronic switching device connected between said coupling element and said input circuit, and means to apply pulse energy to said switching device, thereby to clamp the junction between said input circuit and said capacitive device to a value proportional to said reference potential during application of said applied pulse energy.

2. A feedback clamping circuit for a video frequency electric wave signal translating device having an input circuit coupled by means of a capacitive device to a source of video frequency electric wave signal and an output circuit, including a feedback coupling element coupled to said output circuit, means to apply a reference voltage to said feedback coupling element to produce a potential of the same amplitude as that at said output circuit but of opposite polarity, and means to apply said potential to said capacitive device to bring the charge thereacross to the same instantaneous potential as at said output circuit.

3. A feedback clamping circuit for a video frequency electric wave signal translating device as defined in claim 2 and wherein both of said means are energized by pulse energy.

4. A feedback clamping circuit for a video frequency electric wave signal translating device as defined in claim 2 and wherein said potential applying means comprises a synchronous switching device.

5. A signal transferring circuit arrangement including an electric wave signal translating device having an input circuit and an output circuit, a capacitive coupling device connected to said input circuit, a pulse amplitude modulating circuit comprising a controlled electron flow path device having a common circuit electrode connected to the output circuit of said electric wave signal translating device, an input circuit electrode to which reference potential is applied and an output circuit electrode, and an electronic switching circuit coupled to the output circuit electrode of said controlled electron flow path device, and to the input circuit of said video signal translating device at said capacitive coupling device.

6. A television image signal transferring circuit arrangement including a video frequency wave signal translating device having an input circuit and an output circuit, a capacitive coupling device connecting said input circuit to a preceding circuit, a pulse amplitude modulating circuit comprising a controlled electron flow path device having a common circuit electrode connected to the output circuit of said video frequency wave signal translating device, an input circuit electrode to which reference pulse signals of predetermined amplitude are applied and an output circuit electrode, an electronic switching circuit comprising an electron flow path device, a capacitor coupling a cathode electrode of said electron flow path device to the output circuit electrode of said controlled electron flow path devie, leads coupling an anode electrode of said electron flow path device to the input circuit of said video signal translating device at said capacitive coupling device.

7. A television image signal transferring circuit arrangement including a video frequency wave translating device having an input circuit and an output circuit, a capacitive coupling device connecting said input circuit to a preceding circuit, a pulse amplitude modulating circuit comprising an electron discharge device having a cathode electrode connected to the output circuit of said video frequency wave signal translating device, a control electrode to which pulse signals of reference amplitude are applied and an anode electrode. an electronic switching circuit comprising a bilateral electron discharge system, a capacitor coupling electrodes of said bilateral electron discharge system to the anode electrode of said electron discharge device, leads coupling other electrodes of said bilateral electron discharge system to the input circuit of said video signal translating device at said capacitive coupling device, and means to apply pulse signals to a control electrode of said bilateral electron discharge system.

8. A circuit arrangement including a signal translating device having an input circuit and an output circuit, a capacitive coupling device connecting said input circuit to a preceding circuit, a controlled electron flow path device having input, output and common circuit electrodes, the common circuit electrode being coupled to the output circuit of said signal translating device, means to apply pulse energy to the input circuit electrode of said controlled electron flow path discharge device, and an electronic switching device arranged to interconnect the junction of said capacitive coupling device and the input circuit of said signal translating device and the output electrode of said controlled electron flow path device.

9. A television image signal reproducing circuit arrangement including a video signal translating device having an input circuit and an output circuit, a capacitive device coupling said input circuit to preceding circuit, a controlled electron flow path device having input, output and common circuit electrodes, the common circuit electrode being coupled to the output circuit of said video signal translating device, means to apply pulse energy to the input circuit electrode of said controlled electron flow path discharge device, and a unilateral impedance element coupled between the junction of said capacitive device and the input circuit of said video signal translating device and the output electrode of said controlled electron flow path discharge device.

10. A television image signal reproducing circuit arrangement including a video signal translating device having an input circuit and an output circuit, a capacitor coupling said input circuit to a preceding circuit, a pulse amplitude modulating circuit comprising an electron discharge device having cathode, control and anode electrodes, the cathode electrode being coupled to the output circuit of said video signal translating device, means to apply pulse energy to the control electrode of said electron discharge device, and an electronic switching device comprising a diode element coupled between the junction of said capacitor and the input circuit of said video signal translating device and the anode electrode of said electron discharge device.

11. A feedback clamping circuit arrangement for a video frequency wave amplifying circuit having input and output leads and a capacitive coupling device connected to one of said input leads, including a controlled electron flow path device having a common circuit electrode connected to said output lead, a control electrode to which a train of pulses of reference amplitude is applied and an output electrode, a unilateral impedance device having an anode coupled by a capacitor to said output electrode and a cathode coupled to a point of fixed reference potential by another capacitor and to a point of fixed potential positive with respect to said fixed reference potential, an electronic switching device having electrodes connected to the capacitor coupling the output electrode of said controlled electron flow path device and the anode of said unilateral impedance device, other electrodes connected to the input lead of said video signal translating device at the connection to said capacitive coupling device and a control electrode to which pulse signals are applied to connect and disconnect the feedback clamping circuit from said video wave amplifying circuit.

12. A feedback clamping circuit arrangement for a video frequency wave amplifying circuit having input and output leads and a capacitive device connected to one of said input leads, including a pulse amplitude modulating circuit comprising an electron discharge device having a cathode electrode connected to said output lead, a control electrode to which blanking pulse signals of constant reference amplitude are applied and an anode electrode, a blanking pedestal level setting circuit coupled to said anode electrode and comprising a unilateral impedance device having an anode coupled by a capacitor to said anode electrode and a cathode coupled to a point of fixed reference potential by another capacitor and to a point of fixed potential positive with respect to said fixed reference potential, an electronic switching device comprising a bilateral electron discharge device having electrodes connected to the capacitor coupling the anode electrode of said electron discharge device and the anode of said unilateral impedance device, other electrodes connected to the junction between said capacitive device and said one input lead of said video signal translating device and a control electrode to which pulse signals are applied to connect and disconnect the feedback clamping circuit from said video frequency wave amplifying circuit.

References Cited in the file of this patent

UNITED STATES PATENTS

| | | |
|---|---|---|
| 2,307,375 | Blumlein et al. | Jan. 5, 1943 |
| 2,564,017 | Maggio | Apr. 14, 1951 |

OTHER REFERENCES

AIEE Technical Paper 50-72, "Clampers in Video Transmission," December 1949, 26 pages, Figures 13*a*, *b*, *c*.